United States Patent [19]

Rubio, Jr. et al.

[11] 4,124,546
[45] Nov. 7, 1978

[54] GREEN STRENGTH OF ELASTOMERS

[75] Inventors: Diego C. Rubio, Jr., Akron; Richard G. Bauer, Kent; Richard M. Scriver, Jr., Copley, all of Ohio

[73] Assignee: The Goodyear Tire & Rubber Company, Akron, Ohio

[21] Appl. No.: 692,267

[22] Filed: Jun. 3, 1976

[51] Int. Cl.² .......................... C08L 7/00; C08L 9/00
[52] U.S. Cl. ........................................ 260/5; 260/888; 260/890; 260/891; 260/892; 260/893; 260/894
[58] Field of Search ................... 260/5, 894, 889–893

[56] References Cited

U.S. PATENT DOCUMENTS

| | | | |
|---|---|---|---|
| 3,337,520 | 8/1967 | Bjornson et al. | 260/894 |
| 3,400,086 | 9/1968 | Orr | 260/894 |
| 3,629,373 | 12/1971 | Embree | 260/894 |
| 3,642,762 | 2/1972 | Heij et al. | 260/894 |

*Primary Examiner*—J. Ziegler
*Attorney, Agent, or Firm*—Daniel J. Hudak; J. Y. Clowney

[57] ABSTRACT

Improved green strength of elastomers made from monomers selected from the class consisting of at least one conjugated diene having from 4 to 10 carbon atoms, olefins having from 2 to 14 carbon atoms along with a diene having from 4 to 6 carbon atoms, and combinations thereof, is achieved by adding an amount of a polydimethylbutadiene compound to form a blend having a glass transition temperature of from about 0° C to about −100° C. The polydimethylbutadiene compound may be merely the homopolymer of dimetylbutadiene, the copolymer, the terpolymer or the tetrapolymer of dimethylbutadiene in various combinations with monomers such as butadiene, isoprene, piperylene, acrylonitrile, vinylidene chloride, vinyl pyridine, methacrylic acid and vinyl substituted aromatic compounds.

36 Claims, No Drawings

GREEN STRENGTH OF ELASTOMERS

BACKGROUND OF THE INVENTION

The present invention relates to improved green strength of various elastomers. More specifically, the present invention relates to obtaining improved green strength of various elastomers by adding polydimethylbutadiene, copolymers, terpolymers or tetrapolymers thereof to various elastomers to form various blends.

Science and technology in the elastomer field has improved to such an extent that synthetic elastomers have supplemented or replaced natural rubber to a great extent in the fabrication of tires and other rubber products. Stereospecific polymers and particularly synthetic cis-1,4-polyisoprene have demonstrated physical properties similar to and thus are capable of becoming a complete replacement for natural rubber. However, a major deficiency of rubber elastomers including synthetic cis-1,4-polyisoprene is its lack of sufficient green strength required for satisfactory processing or building properties as in the building of tires. The abatement of this deficiency has long been sought by the art and would greatly facilitate in the replacement of natural rubber which is solely produced in tropical climates.

The term "green strength", while being commonly employed and generally understood by persons skilled in the rubber industry, is nevertheless a difficult property to precisely define. Basically, it is that property of a polymer common in natural rubber, which contributes the proper building conditions where multiple components are employed and which result in little or no release of relative movement of the assembled components subsequent to assembly and prior to initiation of the curing operation. Thus, the problem of low green strength, that is the lack of the requisite mechanical strength for processing and fabricating operations necessarily carried out prior to vulcanization with synthetic polymers or copolymers, is lacking. That is, generally with maximum or "peak" stress which the unvulcanized materials will exhibit during deformation is rather low. Hence, unvulcanized strips or other forms of the elastomer are often distorted during processing or building operations. Although numerous additives and compounds have been utilized in association with various elastomers and particularly synthetic cis-1,4-polyisoprene, substantial improvement in green strength has generally not been accomplished.

Green strength has generally been measured by stress/strain curves of unvulcanized compounds. Usually the performance of a green compound is based upon three points of the stress/strain curve, namely the first peak or inflection of the stress, the ultimate or breaking tensile and the percent of ultimate elongation. Improvements in any one or more of these stress properties indicate improved green strength.

Among the various additive compounds or agents which have been utilized to improve green strength or synthetic rubber elastomers are numerous nitroso compounds as set forth in U.S. Pat. Nos. 2,457,331; 2,477,015; 2,518,576; 2,526,504; 2,540,596; 2,690,780; and 3,093,614. Additionally, various dioxime compounds have been utilized such as those set forth in U.S. Pat. Nos. 2,969,341; 3,037,954; 3,160,595; and British Pat. 896,309. Yet another class of additives or compounds are the diesters of 5-norbornene as set forth in U.S. Pat. Nos. 3,817,883 and 3,843,613.

Another prior art patent is U.S. Pat. 3,562,303 to Smith and McFadden, which relates to increased green strength of polyisoprene rubbers or copolymers of isoprene rubbers through a partial cure. That is, the polymer or copolymer actually cross-links and thus is cured by using from 10 percent to 30 percent of the total amount of sulfur required to effect complete vulcanization and from 10 percent to 50 percent of the total amount of accelerator required to effect such vulcanization. Thus, this patent does not relate to a blend of rubber polymers but solely to copolymers wherein any green strength improvement is solely through a partial sulfur cure.

SUMMARY OF THE INVENTION

It is, therefore, an object of the present invention to provide elastomer blends having improved green strength.

It is another object of the present invention to provide improved green strength elastomer blends, as above, wherein the blend contains elastomers of natural and synthetic cis-1,4-polyisoprene, butadiene, and a copolymer of styrene and butadiene.

It is a further object of the present invention to provide improved green strength elastomer blends, as above, wherein the blend contains an amount of a polydimethylbutadiene compound or copolymers, terpolymers or tetrapolymers of dimethylbutadiene.

It is an additional object of the present invention to provide improved green strength elastomer blends, as above, wherein the elastomer contains a high amount of cis units.

It is still another object of the present invention to provide improved green strength elastomer blends, as above, which are made according to a process and can readily be compounded with conventional compounding agents.

It is a still further object of the present invention to provide improved green strength elastomer blends, as above, which blends are conveniently used in the production of carcasses for radial tires.

It is a still additional object of the present invention to provide improved green strength elastomer blends, as above, which can be utilized for truck tires.

Generally, a process and composition for improving the green strength of blends of elastomers comprises, adding an amount of dimethylbutadiene compound to an elastomer made from monomers selected from the group consisting of at least one conjugated diene having from 4 to 10 carbon atoms, a conjugated diene having from 4 to 10 carbon atoms and an olefin having from 2 to 14 carbon atoms, and combinations thereof to form the blend, said amount of said dimethylbutadiene compound being an amount to cause said blend to have a glass transition temperature of from about 0° C. to about −100° C., said dimethylbutadiene compound being an elastomer selected from the group consisting of polydimethylbutadiene, copolymers of dimethylbutadiene, terpolymers of dimethylbutadiene and tetrapolymers of dimethylbutadiene, said polydimethylbutadienes made from monomers of dimethylbutadiene, said copolymers, said terpolymers and said tetrapolymers of dimethylbutadienes made from monomers selected from the class consisting of dienes having from 4 to 12 carbon atoms, vinylidene chloride, methacrylic acid, vinyl pyridine, acrylonitrile, vinyl substituted aromatic compounds having from 8 to 12 carbon atoms, and combinations thereof.

EMBODIMENTS OF THE INVENTION

According to the concepts of the present invention, improved green strength is obtained by adding a polydimethylbutadiene compound to various elastomers to form blends. These blends are particularly suitable for use as radial tire carcasses and may contain either natural or synthetic cis-1,4-polyisoprene.

The uncured blends of the present invention are made from monomers generally considered by those skilled in the art capable of forming rubbers in combination with one or more of the various polydimethylbutadiene compounds which generally are a polymer of dimethylbutadiene, a copolymer, a terpolymer, or a tetrapolymer of dimethylbutadiene.

More specifically, the elastomers are natural cis-1,4-polyisoprene or synthetic elastomers made from monomers selected from the group of compounds consisting of at least one conjugated diene having from 4 to about 10 carbon atoms so that diene copolymers terpolymers, etc., may be utilized, monomers of dienes having from 4 to 10 carbon atoms with olefins having from 2 to about 14 carbon atoms so that diene-olefin copolymers may be utilized, and combinations thereof. A preferred group of olefin compounds are the vinyl substituted aromatic hydrocarbons containing from 8 to about 12 carbon atoms and include styrene, alpha-methylstyrene, ortho-, para-, and meta-methyl and ethylstyrene and the like. Of the non-aromatic olefin compounds, the compounds containing from 3 to 6 carbon atoms are preferred. Specific examples of olefins include ethene, propene, butene, pentene, hexene, heptene, octene, nonene, decene, dodecene and the like. Concerning the diene compounds, the dienes having from 4 to 6 carbon atoms are preferred.

Specific rubber elastomers which may be utilized in the present invention include polybutadiene, both cis and trans, polyisoprene, both cis and trans, polypiperylene, copolymers or interpolymers of the dienes, for example, isoprene and butadiene, butadiene and piperylene, and the like and terpolymers of dienes such as butadiene, isoprene and piperylene. Additionally, copolymers of a diene and an olefin may be utilized such as styrene and butadiene, alpha-methylstyrene and butadiene, butadiene and propene, butadiene and butene and the like. Of course, combinations of a diene-olefin with at least another diene may also be used. Preferred elastomers of the present invention include natural or synthetic cis-1,4-polyisoprene, polybutadiene, and the copolymer of styrene-butadiene.

When copolymers are prepared utilizing an olefin, the amount of the olefin range may vary from 0.1 to about 99 percent by weight. In other words, so long as a few diene monomers are contained in the monomeric mixture, copolymers can be formed. Generally, the weight percent of the olefin compound will usually range from 0.1 to about 55 percent with a more desirable range being from about 10 percent to about 40 percent. A preferred range of the olefin compounds such as styrene or alpha-methylstyrene ranges from about 15 percent to about 25 percent.

Considering the elastomers, they may have any cis content. Thus, polybutadiene and SBR will generally have a cis-1,4 content of 30 or 40 percent or greater whereas natural or synthetic cis-1,4-polyisoprene will have a cis-1,4 content in excess of 80 percent and often 90 percent. High cis-1,4 content in elastomers is often desirable since the compounded elastomer tends to be fairly elastic.

The elastomers of the present invention, which are utilized in the blends, may generally be prepared according to any conventional or common process or technique. For example, the elastomers may be prepared by anionic polymerization using organometallic compounds as catalysts such as butyllithium. Additionally, the elastomers may be made according to a free radical emulsion process. In any of these processes as well as any others, the various parameters such as time, temperature, pressure and the like as well as the various catalysts and techniques are well known to those skilled in the art.

The dimethylbutadiene compound may be blended with the above-noted elastomers either alone, that is as a polymer of dimethylbutadiene, or as a copolymer, terpolymer or tetrapolymer of dimethylbutadiene. These compounds, or any combination thereof, have been found to give vastly improved green strength to the above elastomers and thus the blends have much improved green strength.

The polymer of dimethylbutadiene may be prepared in any common or conventional manner and thus may be made according to a free radical emulsion process or an anionic process and the like. In accordance with any of these techniques, a polymer is desired which has a number average molecular weight range of from $1 \times 10^5$ to about $5 \times 10^5$ with a preferred range being from about $1.5 \times 10^5$ to about $2.5 \times 10^5$.

The dimethylbutadiene homopolymer, copolymer, terpolymer or tetrapolymer of dimethylbutadiene may be made according to any common, conventional or normal manner or method well known to those skilled in the art. The monomers in addition to the dimethylbutadiene monomers are selected from the group consisting of dienes having from 4 to 12 carbon atoms, vinyl substituted aromatic hydrocarbons having from 8 to 12 carbon atoms, vinylidene chloride, acrylonitrile, methacrylic acid, vinyl pyridine, or the like and any combinations thereof to form a copolymer, terpolymer or tetrapolymer. In other words, if a terpolymer is to be made, any two monomers may be utilized from the immediately above set forth list in combination with a third monomer of dimethylbutadiene.

Considering specifically copolymers of dimethylbutadiene, the additional monomer is preferably selected from the group consisting of dienes having from 4 to 12 carbon atoms, acrylonitrile, vinylidene chloride, methacrylic acid, vinyl pyridine, or the like. Of these, the dienes having from 4 to 6 carbon atoms are preferred and the monomers of butadiene, isoprene, and piperylene are highly preferred.

The dimethylbutadiene compounds in the form of terpolymers are preferably made by polymerizing three different types of monomers. In addition to monomers of dimethylbutadiene, the other monomers preferably include butadiene and monomers selected from the class consisting of vinyl substituted aromatic compounds having from 8 to 12 carbon atoms, methacrylic acid and vinyl pyridine. The vinyl substituted aromatic compounds are desirably those compounds which contain from 8 to 10 carbon atoms. Examples of such compounds include styrene, alpha-methylstyrene, ortho-, para- and meta-methyl and ethylstyrene. Preferred vinyl substituted aromatic compounds include styrene and alpha-methylstyrene. The ratio by weight of styrene to the butadiene may range from 0.1 to 55 percent of the styrene-butadiene copolymer. A preferred range is from 5 to 35 percent with the preferred range being from 15 to 25 percent by weight. In the particular situation where the terpolymer contains a copolymer of styrene and butadiene, the styrene and butadiene monomers may be polymerized in association with the dimethylbutadiene monomers or the copolymer of styrene and butadiene may be added to monomers of dimethylbutadiene and polymerized. In general, the content of any one monomer of the three monomers utilized in making the terpolymer may generally range from about 1 percent to about 98 percent by weight.

An important aspect of the present invention is that an amount of the dimethylbutadiene compound, be it a dimethylbutadiene polymer or a copolymer, a terpolymer or a tetrapolymer thereof, may be added to the above elastomers such as the preferred elastomers of natural and synthetic cis-1,4-polyisoprene, polybutadiene and a copolymer of styrene and a butadiene, in such an amount so that glass transition temperature of the blend will range from about 0° C. to about −100° C. with a preferred range being from about −20° C. to about −80° C. As known to those skilled in the art, the amounts of dimethylbutadiene polymer, copolymers, terpolymers or tetrapolymers thereof will vary depending upon exact makeup of the copolymer, the terpolymer or the tetrapolymer. Of course, an amount of a particular copolymer, terpolymer or tetrapolymer when added to the elastomer to give a desired glass transition temperature can be readily calculated.

Generally, it has been found the copolymers, terpolymers or tetrapolymers of dimethylbutadiene have a glass transition temperature usually within a range of from between −20° C. to about −80° C. Thus, at least 5 parts to about 80 parts by weight of the copolymer, terpolymer or tetrapolymer are utilized with a preferred amount being about 30 parts by weight based upon 100 parts of the total weight of the rubber blend (Dimethylbutadiene compound plus elastomer). An intermediate range is from 20 parts to 60 parts by weight per 100 parts of the total rubber blend. If solely the polymer of dimethylbutadiene is utilized, since the glass transition temperature (Tg) is about −5° C. to +5° C., an amount of this compound added to the blend is generally at least 5 to about 80 parts with a more preferred range being from about 20 parts to about 60 parts by weight based upon 100 parts of the total weight of the rubber blend. Generally, an optimum amount of the dimethylbutadiene polymer or copolymers or terpolymers or tetrapolymers thereof is approximately 30 percent by weight per 100 parts of rubber blend. This amount is largely based upon the fact that it gives very desirable physical property results as well as ease in mixing and the like upon compounding or processing.

Concerning the tetrapolymers of dimethylbutadiene, in addition to the monomers of dimethylbutadiene, of course, three other types of monomers are necessary. As before, either all four of the monomers may be polymerized simultaneously or in various combinations thereof. Besides the monomers of dimethylbutadiene, a remaining preferred class of monomers are the vinyl substituted aromatic hydrocarbons containing from 8 to 12 carbon atoms. The desired range, examples of such compounds and, examples of specific preferred compounds are the same as set forth above. Another group of preferred monomers is butadiene which, in association with the vinyl substituted aromatic compounds, will generally form copolymers such as butadiene-styrene. The range of the styrene to the butadiene is the same as previously set forth above. The fourth remaining preferred monomer may be selected from the group consisting of methacrylic acid and vinyl pyridine. The total amount of any one constituent of the four making up the tetrapolymer may range from 1 percent to 97 percent. As noted above, the important factor is that an amount of the tetrapolymer be utilized so that the glass transition temperature range of the blend will be between 0° C. and −100° C. with an amount as noted above of at least 5 percent by weight of the tetrapolymer being required based upon the total weight of the rubber blend.

The particularly dimethylbutadiene compound or plurality of such compounds are mixed with the particular or plurality of the elastomers in any conventional or common manner, method or process such as on a mill at common or conventional temperatures well known to those skilled in the art. It is to be understood that by such mixing, the elastomer and the dimethylbutadiene compound are merely mixed and not polymerized since the blend is actually a physical blend of two types of components. Typically, during the mixing process or step, the blend is also compounded. This is, various compounds and additives are added to the blend to improve strength, modulus, ease of processing, reduction of oxidation and the like. Thus, typical amounts of various compounds such as carbon blacks, various clays, various silicas, various oils including aliphatic and aromatic oils, various antioxidants and the like are added and mixed together as on a mill. The various types of additives desired are well known to those skilled in the art and will tend to vary as to the type and amount depending on the desired end use of the blend. Additionally, various accelerators such as zinc oxide and curing agents such as peroxides or sulfur curatives may be added. However, they are not initiated or vulcanized during the mixing process according to the present invention. Typically, the compounded blends are then extruded, molded or shaped by any method into a desired form such as the carcass of a tire.

For the purposes of the present invention, it is to be understood that by the term "natural rubber" it is meant the rubber compounds which occurs in and is produced by nature and chemically speaking is (natural) cis-1,4-polyisoprene. This compound, as well known to those skilled in the art, is chemically identical and has very similar physical properties to manmade or synthetic cis-1,4-polyisoprene except that for some reason natural rubber has much better strength. Hence, it is very desirable in the manufacture of tire carcasses and the like.

The improved green strength elastomers of the present invention are generally further blended with either natural rubber (natural cis-1,4-polyisoprene) or a synthetic elastomer. For example, if a synthetic elastomer contains a dimethylbutadiene compound in accordance with the present invention, it will have improved green strength. However, as known to those skilled in the art, it is generally desirable to add and blend an amount of natural rubber to the synthetic elastomer. Such a blend is generally a common and conventional practice in the tire industry and generally produces good tire carcasses as well as treads. Of course, since the synthetic elastomer contains a dimethylbutadiene compound, the resulting blend containing the natural rubber will also have improved green strength.

On the other hand, if natural rubber is utilized, it is desirable to generally blend it with a synthetic elastomer in order to lower the hysteresis (heat generation) and to obtain other favorable attributes as known to those skilled in the art. However, since synthetic elastomers generally have poor low green strength in comparison to natural rubber, the synthetic elastomers will lower the overall green strength of the natural rubber-synthetic elastomer blend. Thus, in accordance with the present invention, the use of a dimethylbutadiene compound with the natural rubber will restore the green strength reduction caused by the synthetic elastomer. Since the dimethylbutadiene compound is a synthetic elastomer itself, it can therefore be used solely or exclusively to overcome the hysteresis problem and yet impart good green strength to the blend.

The blends of the present invention which have greatly improved green strength are particularly suitable for use in the carcasses of tires and especially for truck tires. Other uses include conveyor belts, hoses, shoe soles and other typical industrial uses.

The invention will be better understood by reference to the following examples and data.

EXAMPLE I

A typical recipe for the emulsion polymerization of 2,3-dimethylbutadiene and its copolymers, terpolymers and tetrapolymers is as follows based on a 100 gram monomer charge of 2,3-dimethylbutadiene:

| RECIPE A | | |
|---|---|---|
| | | GRAMS |
| CHARGE A | Water | 192. |
| | 80 percent of Rosin acid | 2.5 |
| | Tamol N (ROHM & HAAS) A sodium sale of a condensed naphthalene sulfonic acid | 0.3 |
| | Sodium or Potassium Phosphate | 0.25 |
| | Fatty Acid | 2.1 |
| | Potassium Hydroxide | 0.40 |
| CHARGE B | 2,3-Dimethylbutadiene | 95. |
| | t-Dodecyl mercaptan | 0.05 |
| CHARGE C | Water | 8. |
| | Sulfuric acid | 0.002 |
| | Ferrous Sulfate | 0.025 |
| | Ethylene diamine tetraacetic acid (34 percent) | 0.2 |
| | Sodium Formaldehyde Sulfoxylate | 0.1 |
| | Sodium Hydrosulfite | 0.01 |
| CHARGE D | 2,3-Dimethylbutadiene | 5. |
| | 50 percent para-menthane hydroperoxide | 0.16 ML |
| CHARGE E | Water | 4.4 |
| | 41 percent sodium dimethyl dithiocarbamate | 0.44 |
| | 85 percent diethanol hydroxylamine | 0.044 |

Charge A is the first charge to a vessel and desirably maintained at a pH of about 10 to about 11 due to the particular soap system utilized. Generally, any conventional sodium salt of an aromatic sulfonic acid may be used. After Charge A, Charge B is added, then Charge C and then Charge D. Preferably, all the monomers being solely the 2,3-dimethylbutadiene or the monomers for forming copolymers, terpolymers or tetrapolymers are first washed in a caustic solution and then in water. If a copolymer, terpolymer, etc. is made, the recipe is basically changed only by adding the co-monomer charge, etc. between steps A and D. The temperature of the polymerization is usually between 40° F. and 50° F. although higher temperatures as up to approximately 150° F. can be utilized due to the low cross-linking constant of dimethylbutadiene. After approximately 50-95 percent of monomer conversion occurs depending on end use of the desired blend and other factors well known to those skilled in the art, the polymerization is stopped by the addition of Charge E. The resulting latex is steam stripped, salt-acid coagulated or alum coagulated and then dried to obtain the dimethylbutadiene compound. Of course, it is to be understood that the above recepe is only an illustration in that the amount as well as the type of various ingredients can vary a substantial amount to achieve many items such as varying molecular weight, molecular weight distribution, rate of polymerization and the like.

Another recipe which may be utilized to produce a dimethylbutadiene compound in accordance with the present invention is set forth in Recipe B.

| RECIPE B | | |
|---|---|---|
| | | GRAMS |
| CHARGE A | Water | 183. |
| | Sodium Sulfate | 0.15 |
| | Sodium Hydroxide | 0.22 |
| | Linear Alkyl Sulfonate e.g. LAS 99 made by PILOT CHEMICAL CO. | 0.5 to 5.0 |
| CHARGE B | Water | 5. |
| | Sulfuric Acid | 0.002 |
| | Ferrous Sulfate | 0.025 |
| | Ethylenediamine tetraacetic acid (34 percent) | 0.2 |
| | Sodium Formaldehyde Sulfoxylate | 0.1 |
| | Sodium Hydrosulfite | 0.01 |
| CHARGE C | 2,3-Dimethylbutadiene | 95. |
| | t-dodecyl mercaptan | 0.05 |
| CHARGE D | 2,3-Dimethylbutadiene | 5. |
| | 50 percent para-menthane hydroperoxide | 0.16 ML |
| CHARGE E | Water | 4.4 |
| | 41 percent sodium dimethyl dithiocarbamate | 0.44 |
| | 85 percent diethanol hydroxylamine | 0.044 |

Basically, the polymerization is conducted in a manner as set forth above with reference to Recipe A. Of course, dimethylbutadiene copolymers, terpolymers, etc. may be made simply by adding the desired amount of various monomers such as butadiene, vinyl pyridine, methacrylic acid, isoprene, and the like. Of course, as before, the ingredients, the temperatures and the like can be varied considerably to obtain polymers containing various molecular weights and processibility.

An advantage of Recipe B is that the soap system is more versatile in that the latex is stable over a wide range of pH (e.g. from 2 to 11) with the pH being adjusted by the use of any conventional linear alkyl sulfonate addition.

The dimethylbutadiene compound be it a homopolymer, a copolymer, a terpolymer, etc. is then blended with any elastomer, either natural or synthetic, as set forth in the specification. If natural rubber is used, it can be obtained from natural sources as well known to those skilled in the art. If a synthetic elastomer is used, the method and preparation is well known to those skilled in the art. For example, if the elastomer is synthetic cis-1,4-polyisoprene, a preferred catalyst such as triisobutyl aluminum/diphenyl ether/TiCl$_4$ is utilized having a molar ratio of 1/1/1. The preform catalyst is added to a solution of isoprene in hexane solvent (20 percent by weight of solvent) and the polymerization is allowed to proceed at approximately 25°–30° C. After about 70 to 80 percent conversion, the reaction may be stopped with tetraethylene pentamine. For protection, a hindered phenol antioxidant is added. A dry elastomer is obtained by steam stripping followed by extrusion drive. As with the preparation of the dimethylbutadiene compound, various parameters may be varied, all within the knowledge of those skilled in the art.

In accordance with the present invention, natural rubber (natural cis-1,4-polyisoprene) was blended with polydimethylbutadiene which was made in accordance with Recipe A. In this formulation, the polydimethylbutadiene also constituted the synthetic elastomer. The blending was achieved by mixing the elastomer and the polydimethylbutadiene in a Brabender for approximately six minutes along with typical compounding ingredients as set forth in Table I. The Tg of the blend ranged from −50° C. to −60° C.

TABLE I

| INGREDIENT | PARTS (WEIGHT) | | |
|---|---|---|---|
| | CONTROL | A | B |
| Cis-1,4-polyisoprene (natural) | 70 | 70 | 70 |
| Polydimethylbutadiene | — | 30 | 30 |
| Cis-1,4-polyisoprene (synthetic) | 30 | — | — |
| Naphthenic Oil | 17.5 | 17.5 | 17.5 |
| HAF Black | 40 | 40 | 40 |
| Medium process oil Naphthenic/Paraffinic | 4 | 4 | 4 |
| Phenolic type oxidant | 1 | 1 | 1 |
| Stearic acid | 1.5 | 1.5 | 1.5 |
| Zinc Oxide | 5.0 | 5.0 | 5.0 |

After compounding, the samples were pressed at 200 psi at 200° F. for 15 minutes, water cooled, then immediately clicked for dumbbells. Dumbbells having a thickness of approximately 1/10 inch were tested on an Instron using a cross-head speed of 20 inches per minute. The following results were obtained.

TABLE II

| GREEN STRENGTH, PSI | CONTROL | A. | B. |
|---|---|---|---|
| Initial | 128 | 228 | 252 |
| ¼ | 125 | 312 | 362 |
| ½ | 141 | 380 | 488 |
| ¾ | 161 | 449 | 568 |
| Tensile at Break | 186 | 514 | 674 |
| Elongation at Break | 480 | 979 | 690 |

As apparent from Table II, Compounds A and B gave vastly improved tensile strength, total elongation as well as improved green strength at initial ¼, ½ and ¾ percent of total elongation.

EXAMPLE II

In a manner similar to Example I, natural rubber was blended with either synthetic cis-1,4-polyisoprene, or SBR (styrene butadiene rubber), or a copolymer of dimethylbutadiene and butadiene, or a copolymer of dimethylbutadiene and methacrylic acid in amounts as set forth in Table III. The polydimethylbutadiene was made in accordance with Recipe A and thus reacted in a conventional manner to form the copolymer with either butadiene or methacrylic acid. As apparent from Table III, the dimethylbutadiene copolymer also constituted the sole synthetic elastomer which was added to the natural rubber. The blending was achieved by mixing the various elastomers set forth in a Brabender along with the typical compounding ingredients set forth in Table III for approximately six minutes.

TABLE III

| INGREDIENT | PARTS (WEIGHT) | | | |
|---|---|---|---|---|
| | I (CONTROL) | II (CONTROL) | III (CONTROL) | IV (CONTROL) |
| Cis-1,4-polyisoprene (natural) | 70 | 70 | 70 | 70 |
| Polydimethylbutadiene - copolymer of | — | — | 30[a] | 30[b] |
| Cis-1,4-polyisoprene (synthetic) | 30 | — | — | — |
| SBR | — | 30 | — | — |
| Naphthenic Oil | 17.5 | 17.5 | 17.5 | 17.5 |
| HAF Black | 40 | 40 | 40 | 40 |
| Medium process oil Naphthenic/Paraffinic | 4 | 4 | 4 | 4 |
| Phenolic type oxidant | 1 | 1 | 1 | 1 |
| Stearic Acid | 1.5 | 1.5 | 1.5 | 1.5 |
| Zinc Oxide | 5.0 | 5.0 | 5.0 | 5.0 |

[a] A copolymer of dimethylbutadiene and butadiene (38/62 by weight)
[b] A copolymer of dimethylbutadiene and methacrylic acid (93½/6½ by weight)

The various blends set forth in Table III generally had a Tg of from −50° C. to about −60° C. Samples of each blend were pressed at 200 psi at 200° F. for 15 minutes, water cooled, and then immediately clicked for dumbbells. Dumbbells having a thickness of approximately 1/10 inch were tested on an Instron using a cross-head speed of 20 inches per minute. The following results were obtained.

TABLE IV

| | I (Control) | II (Control) | III | IV |
|---|---|---|---|---|
| Mooney | 47 | 50 | 50 | 53 |
| 100% Elongation, psi | 34 | 39 | 49 | 65 |
| 300% Elongation, psi | 42 | 46 | 64 | 124 |
| Tensile Strength, psi | 227 | 227 | 280 | 538 |
| Elongation at break, psi | 930 | 1106 | 1169 | 807 |

As readily apparent from Table IV, compounds III and IV gave improved green strength characteristics such as improved tensile strength, improved elongation as well as improved elongation at break.

While in accordance with the patent statutes, only the preferred embodiments have been illustrated and described in detail, it is to be understood that the invention is not limited thereto; the scope of the invention being measured by the scope of the attached claims.

What is claimed is:

1. A process for improving the green strength of blends having good green strength of elastomers, comprising:
   providing an amount of a dimethylbutadiene compound,
   providing an amount of an elastomer,
   producing a physical and an uncured blend by mixing said dimethylbutadiene compound and said elastomer,
   said elastomer selected from the class consisting of natural rubber and synthetic elastomers,
   said synthetic elastomers made from monomers selected from the class consisting of at least one conjugated diene having from 4 to 10 carbon atoms, olefins having from 2 to 15 carbon atoms and a diene having from 4 to 10 carbon atoms; and combinations thereof,
   said blend having a glass transition temperature of from about 0° C. to about −100° C., the amount of said dimethylbutadiene compound ranging from about 5 parts to about 80 parts based upon 100 parts of said blend, said dimethylbutadiene compounds being an elastomer selected from the class consisting of polydimethylbutadiene, copolymers of dimethylbutadiene, terpolymers of dimethylbutadiene, and tetrapolymers of dimethylbutadiene, said polydimethylbutadiene made from monomers of dimethylbutadiene, said copolymers, said terpolymers and said tetrapolymers of dimethylbutadiene made from monomers selected from the class consisting of dienes having from 4 to 12 carbon atoms, and vinyl substituted aromatic hydrocarbons having from 8 to 12 carbon atoms, and combinations thereof.

2. A process according to claim 1 including adding compounding agents and mixing said compounding agents with said blend.

3. A process according to claim 1 wherein said copolymers of dimethylbutadiene are made from monomers of dimethylbutadiene and monomers selected from the class consisting of dienes having from 4 to 12 carbon atoms.

4. A process according to claim 3, wherein said terpolymers and tetrapolymers of dimethylbutadiene are made from monomers of dimethylbutadiene, diene monomers having from 4 to 12 carbon atoms, and monomers selected from the class consisting of vinyl substituted aromatic hydrocarbons having from 8 to 12 carbon atoms.

5. A process according to claim 4, including adding compounding agents and mixing said compounding agents with said blend.

6. A process according to claim 4, wherein said diene monomers utilized in making a copolymer, a terpolymer, or a tetrapolymer of polydimethylbutadiene are selected from the class consisting of butadiene, isoprene and piperylene, said monomers forming said elastomers are selected from the class consisting of conjugated dienes having from 4 to 6 carbon atoms, vinyl substituted aromatic compounds having from 8 to 12 carbon atoms and conjugated dienes having from 4 to 6 carbon atoms, and combinations thereof.

7. A process according to claim 6, wherein said vinyl substituted aromatic hydrocarbon monomers of said dimethylbutadiene compound are selected from the class consisting of styrene and alpha-methylstyrene.

8. A process according to claim 7, including adding compounding agents and mixing said compounding agents with said blend.

9. A process according to claim 7, wherein said dimethylbutadiene compounds are selected from the class consisting of polydimethylbutadiene, a copolymer of dimethylbutadiene and butadiene, a copolymer of dimethylbutadiene and isoprene, a copolymer of dimethylbutadiene and piperylene, a terpolymer of dimethylbutadiene, butadiene and styrene, and wherein said elastomer is selected from the class consisting of natural rubber synthetic cis-1,4-polyisoprene, polybutadiene and a copolymer of styrenebutadiene.

10. A process according to claim 1, wherein the glass transition temperature of said blend ranges from about −20° C. to about −80° C.

11. A process according to claim 10, wherein said elastomer is made from monomers selected from the class consisting of conjugated dienes having from 4 to 6 carbon atoms, vinyl substituted aromatic compounds having from 8 to 12 carbon atoms and conjugated dienes having from 4 to 6 carbon atoms, and combinations thereof.

12. A process according to claim 10, wherein said copolymer of dimethylbutadiene is made from monomers of dimethylbutadiene and monomers selected from the class consisting of dienes having from 4 to 12 carbon atoms.

13. A process according to claim 12, wherein said terpolymers and said tetrapolymers of dimethylbutadiene are made from monomers of dimethylbutadiene, diene monomers having from 4 to 12 carbon atoms, and monomers selected from the class consisting of vinyl substituted aromatic hydrocarbons having from 8 to 12 carbon atoms.

14. A process according to claim 13, including adding compounding agents and mixing said compounding agents with said blend.

15. A process according to claim 13, wherein said vinyl substituted aromatic hydrocarbon monomers have from 8 to 10 carbon atoms.

16. A process according to claim 13, wherein said diene monomers utilized in making said copolymer, said terpolymer and said tetrapolymers of polydimethylbutadiene are selected from the class consisting of butadiene, isoprene and piperylene, said monomers forming said elastomers are selected from the class consisting of conjugated dienes having from 4 to 6 carbon atoms, vinyl substituted aromatic compounds having from 8 to 12 carbon atoms and conjugated dienes having from 4 to 6 carbon atoms, and combinations thereof.

17. A process according to claim 16, wherein said vinyl substituted aromatic hydrocarbon monomers forming said elastomers as well as said copolymers, terpolymers, and tetrapolymers of polydimethylbutadiene are selected from the class consisting of styrene and alpha-methylstyrene.

18. A process according to claim 15, wherein said elastomer is selected from the class consisting of natural rubber or synthetic cis-1,4-polyisoprene, polybutadiene and a copolymer of styrene-butadiene.

19. A process according to claim 16, wherein the amount of said dimethylbutadiene homopolymer, said dimethylbutadiene copolymers, said dimethylbutadiene terpolymers and said dimethylbutadiene tetrapolymers is from about 20 to about 60 percent by weight based upon the total weight of said blend.

20. A process according to claim 19, wherein said dimethylbutadiene compound is selected from the class consisting of dimethylbutadiene, a copolymer of dimethylbutadiene and butadiene, a copolymer of dimethylbutadiene and isoprene, a copolymer of dimethylbutadiene and piperylene, a terpolymer of dimethylbutadiene, butadiene and styrene.

21. A process according to claim 20, including adding compounding agents and mixing said compounding agents with said blend.

22. A process according to claim 20, wherein said dimethylbutadiene compound is selected from the class consisting of polydimethylbutadiene, a copolymer of dimethylbutadiene and butadiene, a copolymer of dimethylbutadiene and isoprene and, a terpolymer of dimethylbutadiene, butadiene and styrene.

23. A process according to claim 22, wherein said butadiene compound is selected from the class consisting of polydimethylbutadiene, and a copolymer of dimethylbutadiene and butadiene, 24. A process according to claim 23, wherein the amount of elastomer is approximately 70 percent by weight and the amount of said dimethylbutadiene compound is approximately 30 percent by weight.

25. A composition of elastomer blends having improved green strength, comprising:
a physical and uncured blend of a dimethylbutadiene compound and an elastomer, the amount of said dimethylbutadiene compound ranging from about 5 parts to about 80 parts per 100 parts of said blend, said elastomer selected from the class consisting of natural rubber and synthetic elastomers,
said synthetic elastomers made from monomers selected from the class consisting of at least one diene having from 4 to 10 carbon atoms, a diene having from 4 to 10 carbon atoms and an olefin having from 2 to 14 carbon atoms, and combinations thereof to form a blend having a glass transition temperature of from about 0° C. to about −100° C.,
said dimethylbutadiene compound being an elastomer selected from the class consisting of polydimethylbutadiene, copolymers of dimethylbutadiene, terpolymers of dimethylbutadiene, and tetrapolymers of dimethylbutadiene,
said copolymers of dimethylbutadiene, said terpolymers of dimethylbutadiene and said tetrapolymers of dimethylbutadiene made from monomers of dimethylbutadiene and monomes selected from the class consisting of dienes having from 4 to 12 carbon atoms, vinyl substituted aromatic hydrocarbon monomers having from 8 to 12 carbon atoms, and combinations thereof.

26. A process according to claim 25, including adding compounding agents and mixing said compounding agents with said blend.

27. A composition according to claim 25, wherein said monomers forming said elastomer is selected from the class consisting of conjugated dienes having from 4 to 6 carbon atoms, vinyl substituted aromatic compounds having from 8 to 12 carbon atoms and conjugated dienes having from 4 to 6 carbon atoms, and combinations thereof.

28. A composition according to claim 27, wherein said dimethylbutadiene compounds are selected from the class consisting of polydimethylbutadiene, a copolymer of dimethylbutadiene and butadiene, a copolymer of dimethylbutadiene and isoprene, a copolymer of dimethylbutadiene and, and a terpolymer of dimethylbutadiene, butadiene and styrene.

29. A composition according to claim 28, including adding compounding agents and mixing said compounding agents with said blend.

30. A composition according to claim 28, wherein the amount of said elastomer is about 70 percent by weight and the amount of said dimethylbutadiene compound is about 30 percent by weight.

31. A composition according to claim 30, including adding compounding agents and mixing said compounding agents with said blend.

32. A composition according to claim 27, wherein said copolymer of dimethylbutadiene is made from monomers of dimethylbutadiene and monomers selected from the class consisting of dienes having from 4 to 12 carbon atoms.

33. A composition according to claim 27, wherein said terpolymers and said tetrapolymers of dimethylbutadiene are made from monomers of dimethylbutadiene, diene monomers having from 4 to 12 carbon atoms, and monomers selected from the class consisting of vinyl substituted aromatic hydrocarbons having from 8 to 12 carbon atoms.

34. A composition according to claim 27, wherein said vinyl substituted aromatic hydrocarbon monomers of said dimethylbutadiene compound are selected from the class consisting of styrene and alpha-methylstyrene.

35. A composition according to claim 34, wherein said diene monomers forming said dimethylbutadiene compound are selected from the class consisting of butadiene isoprene, and piperylene.

36. A composition according to claim 35, wherein said elastomers are selected from the class consisting of natural rubber, synthetic cis-1,4-polyisoprene, polybutadiene, and a copolymer of styrene-butadiene.

* * * * *